(12) United States Patent
Xia et al.

(10) Patent No.: US 9,434,630 B2
(45) Date of Patent: Sep. 6, 2016

(54) WATER TREATMENT DEVICE AND METHOD

(71) Applicants: Zijun Xia, Shanghai (CN); Wei Cai, Shanghai (CN); Rihua Xiong, Shanghai (CN); Chengqian Zhang, Shanghai (CN); Jiyang Xia, Shanghai (CN); Andrew Jon Zaske, Chanhassen, MN (US)

(72) Inventors: Zijun Xia, Shanghai (CN); Wei Cai, Shanghai (CN); Rihua Xiong, Shanghai (CN); Chengqian Zhang, Shanghai (CN); Jiyang Xia, Shanghai (CN); Andrew Jon Zaske, Chanhassen, MN (US)

(73) Assignee: General Electric Company, Schenectady, NY (US)

( * ) Notice: Subject to any disclaimer, the term of this patent is extended or adjusted under 35 U.S.C. 154(b) by 64 days.

(21) Appl. No.: 14/360,415

(22) PCT Filed: Nov. 9, 2012

(86) PCT No.: PCT/US2012/064350
§ 371 (c)(1),
(2) Date: May 23, 2014

(87) PCT Pub. No.: WO2013/078020
PCT Pub. Date: May 30, 2013

(65) Prior Publication Data
US 2014/0311960 A1    Oct. 23, 2014

(30) Foreign Application Priority Data

Nov. 23, 2011  (CN) .......................... 2011 1 0375268

(51) Int. Cl.
*C02F 1/42* (2006.01)
*B01D 43/00* (2006.01)
(Continued)

(52) U.S. Cl.
CPC .................. *C02F 9/00* (2013.01); *C02F 1/447* (2013.01); *C02F 1/463* (2013.01); *C02F 1/469* (2013.01);
(Continued)

(58) Field of Classification Search
CPC ...... B01D 43/00; B01D 61/36; B01D 61/42; C02F 1/4695; C02F 1/469; C02F 1/461; C02F 1/42
USPC ......... 210/652, 900, 748.01, 748.16, 748.19, 210/639, 640, 758, 754, 760, 767, 253, 143, 210/195.2, 196, 200, 295, 241, 242.1; 205/751, 752, 756, 749; 204/276–277; 29/890.09
See application file for complete search history.

(56) References Cited

U.S. PATENT DOCUMENTS 7,462,287 B2    12/2008   Berrak
7,820,024 B2    10/2010   Freydina
(Continued)

FOREIGN PATENT DOCUMENTS

CA      2423213 A1    9/2004
CN    101734816 A    6/2010
(Continued)

OTHER PUBLICATIONS

Cheng et al., "Industrial Application Experiment for Reuse of Sewage in Circulating Cooling Water System", Petrochemical Industry Technology, vol. No. 10, Issue No. 02, pp. 49-51, Jun. 25, 2003.

(Continued)

*Primary Examiner* — Walter D Griffin
*Assistant Examiner* — Cameron J Allen
(74) *Attorney, Agent, or Firm* — GE Global Patent Operation

(57) ABSTRACT

A water treatment device including an electro-coagulation (EC) unit for treating a stream of feed water to produce a stream of EC treated water of lower salinity than the stream of feed water, an electrical separation unit for treating the stream of EC treated water to obtain a stream of product water of lower salinity than the EC treated water, and a precipitation unit for providing a stream of wash water to wash the electrical separation unit and become a stream of reject water flowing back to the precipitation unit, wherein precipitation in the precipitation unit produces the stream of wash water of lower salinity than the stream of reject water.

12 Claims, 1 Drawing Sheet

(51) Int. Cl.
*C02F 9/00* (2006.01)
*C02F 1/463* (2006.01)
*C02F 1/469* (2006.01)
*C02F 1/461* (2006.01)
*C02F 1/52* (2006.01)
*C02F 1/44* (2006.01)

(52) U.S. Cl.
CPC ........... *C02F 1/4691* (2013.01); *C02F 1/4693* (2013.01); *C02F 1/46104* (2013.01); *C02F 1/52* (2013.01); *C02F 1/441* (2013.01)

(56) References Cited

U.S. PATENT DOCUMENTS

| | | | | |
|---|---|---|---|---|
| 8,119,008 | B2 * | 2/2012 | Heiss | 210/652 |
| 2005/0000905 | A1 | 1/2005 | Fields | |
| 2011/0114567 | A1 | 5/2011 | Xia et al. | |
| 2011/0210069 | A1 | 9/2011 | Xiong et al. | |
| 2012/0325743 | A1 | 12/2012 | Xia et al. | |

FOREIGN PATENT DOCUMENTS

| | | |
|---|---|---|
| CN | 201722245 U | 1/2011 |
| CN | 102099302 A | 6/2011 |
| CN | 102187463 A | 8/2011 |
| CN | 102190380 A | 9/2011 |
| JP | 0780254 A | 3/1995 |
| SU | 1838248 A3 * | 8/1993 |
| WO | 2010028097 A1 | 3/2010 |
| WO | 2011014300 A1 | 2/2011 |
| WO | 2011043686 A1 | 4/2011 |

OTHER PUBLICATIONS

Unofficial English Translation of Chinese Office Action issued in connection with corresponding CN Application No. 201110375268.X on Jun. 12, 2014.

"3 GPM EC System", Powell Water Systems, Inc, pp. 1-28, 2001.

Gabelich et al., "High-recovery reverse osmosis desalination using intermediate chemical demineralization", Journal of Membrane Science, vol. No. 301, pp. 131-141, 2007.

International Search Report and Written Opinion issued in connection with corresponding PCT Application No. PCT/US2012/064350 on Feb. 22, 2013.

Unofficial English translation of Office Action issued in connection with corresponding CN Application No. 201110375268.X on Nov. 15, 2013.

* cited by examiner

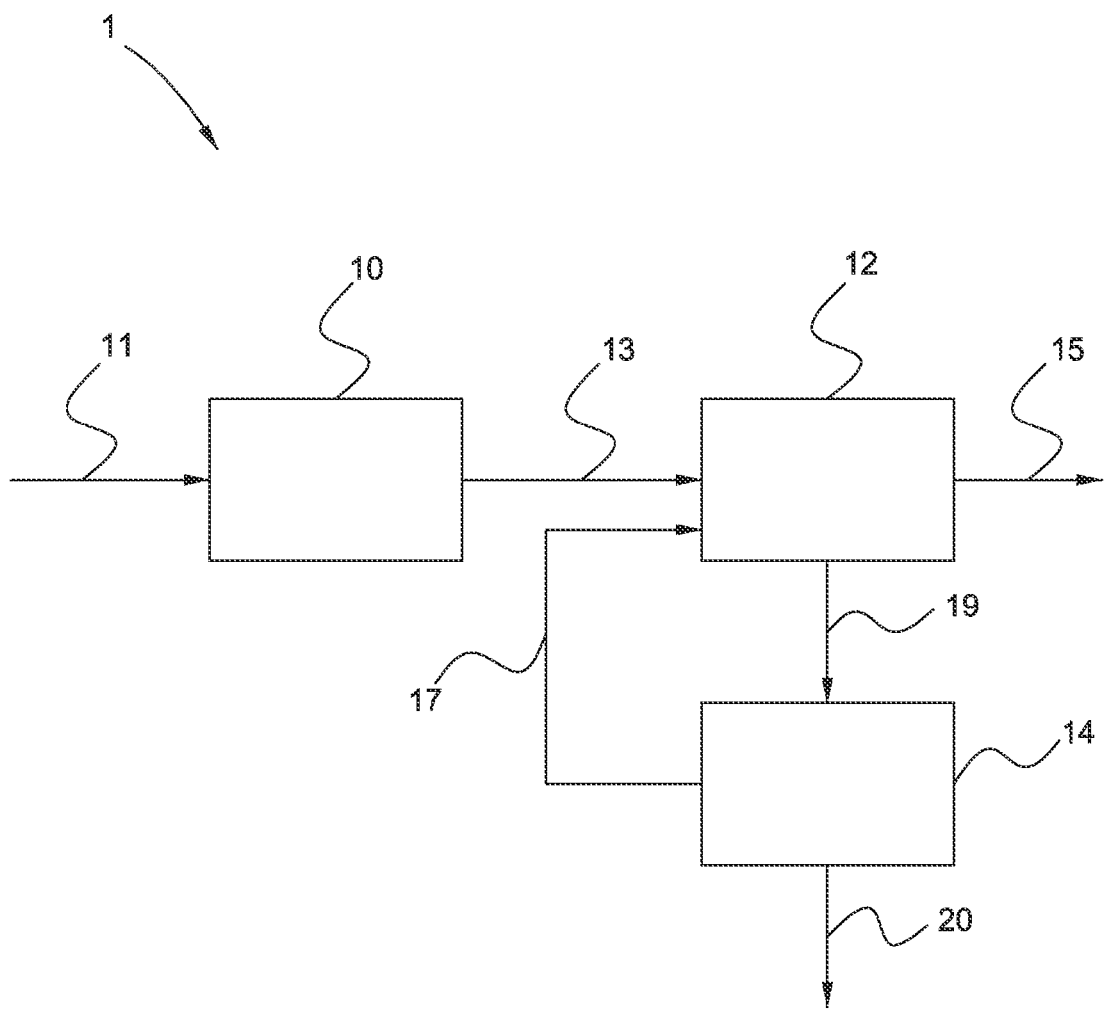

WATER TREATMENT DEVICE AND METHOD

BACKGROUND

The invention relates generally to liquid treatment devices and methods. More particularly, this invention relates to water treatment devices and methods.

The imbalance between the scarcity and the need of consumable water in the world increases dramatically these years. Thus, water treatment device and method with high water recovery are more and more wanted.

Christopher J. Gabelich et al. publishes on Journal of Membrane Science 301 (2007) 131-141 an article titled as "High-recovery reverse osmosis desalination using intermediate chemical demineralization". The article discloses a two-stage reverse osmosis (RO) process involving intermediate chemical demineralization (ICD) of the concentrate stream from a primary RO (PRO) followed by secondary RO (SRO) desalting.

Because of scaling risk, the salinity (characterized by, e.g., the concentration of salts or other ionic impurities), the hardness (characterized by, e.g., the concentration of $Ca^{2+}$, $Mg^{2+}$, $Ba^{2+}$ etc.) the alkalinity (characterized by, e.g., the concentration of $CaCO_3$) and the concentration of silica are important factors of determining the water quality after treating the concentrate water from, e.g., the membrane desalination device, the cooling tower or any other thermal evaporation device and the process in the article and other prior arts do not provide satisfactory results so far.

Therefore, there is a need to develop a new water treatment device and method.

BRIEF DESCRIPTION

In one aspect, a water treatment device is provided, comprising: an electro-coagulation (EC) unit for treating a stream of feed water to produce a stream of EC treated water of lower salinity than the stream of feed water; an electrical separation unit for treating the stream of EC treated water to obtain a stream of product water of lower salinity than the EC treated water; and a precipitation unit for providing a stream of wash water to wash the electrical separation unit and become a stream of reject water flowing back to the precipitation unit, wherein precipitation in the precipitation unit produces the stream of wash water of lower salinity than the stream of reject water.

In another aspect, a method is provided. The method comprises: treating a stream of feed water in an electro-coagulation (EC) unit to produce a stream of EC treated water of lower salinity than the stream of feed water; treating the stream of EC treated water in an electrical separation unit to obtain a stream of product water of lower salinity than the EC treated water; providing from a precipitation unit a stream of wash water to wash the electrical separation unit and become a stream of reject water, wherein precipitation in the precipitation unit produces the stream of wash water of lower salinity than the stream of reject water.

These and other advantages and features will be better understood from the following detailed description of preferred embodiments of the invention that is provided in connection with the accompanying drawings.

BRIEF DESCRIPTION OF THE DRAWINGS

FIG. 1 is a schematic diagram of a water treatment device in accordance with one embodiment of the invention.

DETAILED DESCRIPTION

Preferred embodiments of the present disclosure will be described hereinbelow with reference to the accompanying drawings. In the following description, well-known functions or constructions are not described in detail to avoid obscuring the disclosure in unnecessary detail.

Approximating language, as used herein throughout the specification and claims, may be applied to modify any quantitative representation that could permissibly vary without resulting in a change in the basic function to which it is related. Accordingly, a value modified by a term or terms, such as "about", is not to be limited to the precise value specified. In some instances, the approximating language may correspond to the precision of an instrument for measuring the value.

In the following specification and claims, the singular forms "a", "an" and "the" include plural referents, unless the context clearly dictates otherwise. Moreover, the suffix "(s)" as used herein is usually intended to include both the singular and the plural of the term that it modifies, thereby including one or more of that term.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable. For example, in some circumstances, an event or capacity can be expected, while in other circumstances, the event or capacity cannot occur. This distinction is captured by the terms "may" and "may be".

As used herein, the term "salinity" indicates the saltiness or dissolved salt or ionic impurities content of a body of water characterized by, e.g., the concentration of salts, such as sodium chloride, magnesium and calcium sulfates, and bicarbonates, and/or other ionic impurities. In some embodiments, the salinity means the total concentration of dissolved salts and ionic impurities in the water.

As used herein, the term "hardness" indicates the level of mineral content in water and hard water is water that has high mineral content (in contrast with soft water). Hard water has high concentrations of $Ca^{2+}$, $Ba^{2+}$ and $Mg^{2+}$ ions.

As used herein, the term "alkalinity" indicates the ability of a solution to neutralize acids to the equivalence point of carbonate or bicarbonate. The alkalinity is equal to the stoichiometric sum of the bases in solution. In some embodiments, the alkalinity is characterized by the concentration of calcium carbonate.

FIG. 1 is a schematic diagram of a water treatment device 1 in accordance with one embodiment of the present invention. The water treatment device 1 comprises: an electro-coagulation (EC) unit 10 for treating a stream of feed water 11 to produce a stream of EC treated water 13 less saline than the stream of feed water 11; an electrical separation unit 12 for treating the stream of EC treated water 13 to obtain a stream of product water 15 of lower salinity than the EC treated water 13; and a precipitation unit 14 for providing a stream of wash water 17 to wash the electrical separation unit 12 and become a stream of reject water 19 flowing back to the precipitation unit 14, wherein precipitation in the precipitation unit 14 produces the stream of wash water 17 of lower salinity than the stream of reject water 19.

The term "electrocoagulation (EC)" used herein refers to a method or an apparatus in which an electrical potential is applied between a cathode and an anode positioned so as to create an electric field in the aqueous stream, the aqueous stream and dissolved substances therein being an electrolyte. In the electrocoagulation process, the suspended, emulsified or dissolved contaminants in an aqueous stream are destabilized by means of introducing an electrical current which provides the electromotive force to drive the chemical reactions between ions and particles. While reactions are driven or forced, the elements or formed compounds will move toward the most stable state. As a result, this state of stability produces a solid, generally having a propensity to adhere to other solids, colloids, oil (free or emulsified), or non-aqueous phase liquids. This process acts to promote destabilization and removal of these constituents beyond that which would be achieved in the absence of the electrical current. The contaminants are then removed by secondary separation techniques, for example, floatation, sedimentation and filteration.

If at least one of the cathode and the anode is sacrificial and is made from materials such as iron, steel, aluminum, zinc and magnesium, ions therefrom migrate into the electrolyte and form metal hydroxide species having very low solubility, thus becoming solids. The metal hydroxide species will agglomerate to and bind with other like- and non-like-metal hydroxide species and will also bind with and/or entrap other constituents (such as, but not limited to, oils, colloids, suspended solids). Under correct operation, these solids will grow to sufficiently large size to be removed by gravity, flotation or filtration. In some embodiments, an electrode used in the EC process is made of at least one of iron and aluminum and the electrochemical reactions for releasing ions from the electrode are $Al \rightarrow Al^{3+}+3e^-$ or $Fe \rightarrow Fe^{2+}+2e^-$.

When operating the electrocoagulation apparatus with non-sacrificial electrodes, for example with electrically conductive synthetic graphite electrodes or titanium electrodes, the necessary positively charged ions for maintaining the electrocoagulation process are partially provided by the feed water itself. The remaining part of the required positively charged ions are added in the form of metallic ions such as salts of aluminum, calcium, iron or magnesium. For an enhanced electron migration, the electrocoagulation process may be operated within the acidic range through chemical dosing with hydrochloric acid (HCl), sulfuric acid ($H_2SO_4$) or phosphoric acid ($H_3PO_4$), . . . , etc. The electrocoagulation process may be operated at neutral and basic conditions too.

The EC process may be operated with more than two electrodes. There may be two EC arrangements when more than two electrodes are used, i.e., monopolar EC arrangement and bipolar EC arrangement. A monopolar EC arrangement means that each pair of electrodes is internally connected with each other, and has no interconnection with other electrodes. All electrodes are connected directly to the power supply. For example, the arrangement of four electrodes could be described as: (+, −, +, −) and for six electrodes as: (+, −, +, −, +, −), and so on, in which "+, −" stand for electrodes of different polarities, i.e., "+" represents anode and "−" represents cathode. This setup may also require a resistance box to regulate the flow current and a multimeter to read the current values.

A bipolar EC arrangement means that only two monopolar outer electrodes are connected directly to the power supply whereas the other electrodes located between the two monopolar outer electrodes are affected by electrical potential indirectly. The inner electrodes are identified as bipolar electrodes, i.e., the neutral sides of the conductive plate are transformed to charged sides, which have reverse charge compared with the parallel side beside it. For example, the arrangement of four electrodes could be described as: (+, 0, 0, −) and for six electrodes as: (+, 0, 0, 0, 0, −) and so on, in which "+" represents anode, "−" represents cathode, and "0" stands for bipolar electrode.

Depending on the ingredients of the aqueous stream to be treated, additives may be used if needed during the electrocoagulation. The additives may be later removed, or involved in the chemical processes to form precipitates. For example, chemical oxidants such as hydrogen peroxide, Fenton's reagent (reaction products of hydrogen peroxide and ferrous iron ($Fe^{2+}$)), permanganate (added as either potassium permanganate ($KMnO_4$) or sodium permanganate ($NaMnO_4$)), and ozone ($O_3$) may be added if needed. Besides, when non-sacrificial cathodes and anodes are used, the additives may be used to form ions to interact with solutes and particulate matter in coagulating the impurities out of suspension and solution. When sacrificial cathodes and anodes are used, additives may be used to increase the conductivity of the water stream to enhance electrocoagulation processes.

In some embodiments, an effective amount of ionic flocculant is added in the EC process. In some embodiments, the ionic flocculant comprises at least one of an acrylamide/quaternary ammonium salt copolymer, a copolymer of epichlorohydrin and amine, an acrylamide allyl trialkyl ammonium copolymer, an acrylamide/diallyl dialkyl ammonium copolymer, acrylamide/acrylic acid copolymers and salts thereof, acrylamide/alkylacrylate copolymers, acrylamide/maleic acid copolymers, acrylamide maleic anhydride copolymers, acrylamide/2-Acrylamido-2-methylpropane sulfonic acid (AMPS) copolymers, acrylic acid homopolymers and salts thereof, and acrylic acid/AMPS copolymers.

Exemplary cationic acrylamide/quaternary ammonium salt copolymers may be represented by the following Formula I:

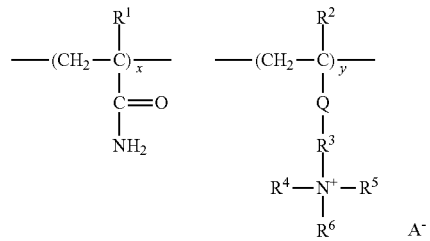

In Formula I, the molar ratio of repeat units x:y may vary from 95:5 to 5:95 with the molar ratio x:y of 60:40 being presently preferred. $R^1$ and $R^2$ may be the same or different and are chosen from H and $CH_3$. Q is —C(O)O—, —OC(O)—, or —C(O)NH—. $R^3$ is branched or linear ($C_1$-$C_4$) alkylene. $R^4$, $R^5$, and $R^6$ are independently chosen from H, $C_1$-$C_4$ linear branched alkyl, and an $C_5$-$C_8$ aromatic or alkylaromatic group. $A^-$ is an anion selected from $Cl^-$, $Br^-$, $HSO_4^-$, or $MeOSO_3^-$.

Exemplary repeat units y are as follows: (AETAC)-2-acryloxyethyltrimethyl ammonium chloride, also referred to as dimethylaminoethylacrylate methyl chloride, in terms of Formula I above, $R^1$=H, $R^2$=H, Q is —C(O)O—, $R^3$=Et, $R^4$, $R^5$ and $R^6$ are all Me, and A- is Cl—; (MATAC)-3-(meth) acrylamidopropyltrimethyl ammonium chloride, in terms of Formula I above, $R^1$=H, $R^2$=$CH_3$, Q is —C(O)NH—, $R^3$=Pr, $R^4$, $R^5$ and $R^6$ are all Me, and $A^-$ is $Cl^-$; (METAC)-2-methacryloxyethyltrimethyl ammonium chloride, in terms of Formula I above $R^1$=H, $R^2$=$CH_3$, Q is —C(O)O—, $R^3$ is Et and $R^4$, $R^5$ and $R^6$ are all Me, and $A^-$ is $Cl^-$.

One exemplary cationic flocculant copolymer is a 60:40 mole percent acrylamide/AETAC copolymer. The copolymer may be cross-linked as explained hereinafter. The degree of cross-linking is relatively minor and can amount from about $1 \times 10^{-4}\%$ to about $5 \times 10^{-3}\%$ based on 100 molar percent of the repeat units (x) and (y) present. Also, non-cross-linked copolymers may be used. Other acrylamide/AETAC copolymers that may be mentioned include those in which AETAC is present in a molar amount of about 10%-50%.

The molecular weight of the copolymer may vary over a wide range, for example, 10,000-20,000,000. Usually, the copolymers will have molecular weights in excess of 1,000,000. The cationic flocculant copolymer should be water soluble or dispersible. It is present practice to employ the cationic flocculant copolymer in the form of a water in oil emulsion. The oil phase may comprise hydrotreated isoparaffins and napthenics with a low level of aromatics.

Additional cationic flocculants that may be mentioned include polyEPI/DMA (a copolymer of epichlorohydrin and dimethylamine), and acrylamide/allyl trialkyl ammonium copolymer or an acrylamide diallyldialkyl ammonium copolymer. The molecular weights of these cationic flocculants may range, for example, from about 10,000 to 20,000,000.

The anionic flocculants that may be noted as exemplary are primarily acrylamide copolymers such as acrylamide/acrylic acid copolymers, acrylamide alkylacrylate copolymer, acrylamide/maleic acid, acrylamide maleic anhydride copolymers, and acrylamide/2-acrylamido-2-methyl propane sulfonic acid (AMPS). Additionally, acrylic acid homopolymers and salt forms, especially sodium salts may be mentioned along with acrylic acid based copolymers such as acrylic acid/AMPS copolymers. Of specific note are the acrylic acid (AA)/acrylamide copolymers wherein the AA is present in an amount of about 20 molar %-50 molar %.

The feed water may originate from a membrane desalination device, a cooling tower, or other thermal evaporation device. In some embodiments, the feed water is the concentrate water of at least one of a membrane desalination device, a cooling tower, and other thermal evaporation device.

In some embodiments, the water treatment device further comprises a membrane desalination unit before the EC unit. The membrane desalination unit may comprise a nanofiltration membrane device, a reverse osmosis membrane device or a combination thereof.

A combination of the electrical separation unit and the precipitation unit may be called the non-thermal brine concentrator (NTBC). The electrical separation unit 10 may comprise an electrodialysis reversal (EDR) desalination device, a supercapacitive desalination (SCD) device, or a combination thereof.

For certain arrangements, the electrical separation unit may comprise an SCD device. The term "SCD device" may generally indicate supercapacitors that are employed for desalination of seawater or deionization of other brackish waters to reduce the amount of salt or other ionized impurities to a permissible level for domestic and industrial use. In certain applications, the supercapacitor desalination device may comprise one or more supercapacitor desalination cells (not shown). As is known, in non-limiting examples, each supercapacitor desalination cell may at least comprise a pair of electrodes, a spacer, and a pair of current collectors attached to the respective electrodes. A plurality of insulating separators may be disposed between each pair of adjacent SCD cells when more than one supercapacitor desalination cell stacked together is employed.

In embodiments of the invention, the current collectors may be connected to positive and negative terminals of a power source (not shown), respectively. Since the electrodes are in contact with the respective current collectors, the electrodes may act as anodes and cathodes, respectively.

During the charging state of the supercapacitor desalination device 12, the EC treated water 13 from the EC unit 10 enters into the SCD device for desalination. In this state, the flow path of the wash stream 17 to the SCD device 12 is closed by valve (not shown). Positive and negative electrical charges from the power source accumulate on surfaces of the anode(s) and the cathode(s), respectively and attract anions and cations from the ionized EC treated water 13, which causes them to be adsorbed on the surfaces of the anode(s) and the cathode(s), respectively. As a result of the charge accumulation on the anode(s) and the cathode(s), the product water 15 from the SCD device 12 may have a lower salinity (concentration of salts or other ionic impurities) as compared to the EC treated water 13.

In the discharging state of the supercapacitor desalination device 12, the adsorbed anions and cations dissociate from the surfaces of the anode(s) and the cathode(s), respectively. The wash water 17 is pumped by pump (not shown) from the precipitation unit 14 to enter the SCD device 12 to wash and carry ions (anions and cations) therefrom. The reject water 19 flowing from the SCD device 12 and has a higher salinity (concentration of the salt or other ionic impurities) as compared with the wash water 17. In this state, the flow path of the EC treated water 13 to the SCD device 12 is closed by the valve (not shown).

After discharging of the SCD device is complete, the SCD device is placed in the charging state for a period of time for preparation of a subsequent discharging. That is, the charging and the discharging of the SCD device are alternated for treating the EC treated water 13 and the wash water 17, respectively.

As the water is circulated through the SCD unit and the precipitation unit in the discharging state, the concentration of salts or other ionic impurities in the water increases so as to produce precipitate in the precipitation unit 14. The precipitate particles (solids) with diameters larger than a specified diameter may settle by gravity in the lower portion of the precipitation unit 14. Other precipitate particles with diameters smaller than the specified diameter may be dispersed in the water.

When the precipitation rate plus a discharge rate from the precipitation unit equals the charged species removal rate from the EC treated water 13, where the rates are averaged over one or more charging-discharging cycles, the degree of saturation or supersaturation of the streams circulating between the SCD unit and the precipitation unit may stabilize and a dynamic equilibrium may be established.

In certain examples, the energy released in the discharging state may be used to drive an electrical device (not shown), such as a light bulb, or may be recovered using an energy recovery cell, such as a bi-directional DC-DC converter.

In other non-limiting examples, similar to the SCD cells stacked together, the supercapacitor desalination device may comprise a pair of electrodes, a pair of current collectors attached to the respective electrodes, one or more bipolar electrodes disposed between the pair of electrodes, and a plurality of spacers disposed between each of the pairs of adjacent electrodes for processing the EC treated water 13 in a charging state and the wash water 17 in a discharging state at the same time. Each bipolar electrode has a positive side and a negative side, separated by an ion-impermeable layer.

In some embodiments, the current collectors may be configured as a plate, a mesh, a foil, or a sheet and formed from a metal or metal alloy. The metal may include titanium, platinum, iridium, or rhodium, for example. The metal alloys may include stainless steel, for example. In other embodiments, the current collectors may comprise graphite or plastic material, such as polyolefin, which may include polyethylene. In certain applications, the plastic current collectors may be mixed with conductive carbon blacks or metallic particles to achieve a certain level of conductivity.

The electrodes and/or bipolar electrodes may include electrically conductive materials, which may or may not be thermally conductive, and may have particles with small sizes and large surface areas. In some examples, the electrically conductive material may include one or more carbon materials. Non-limiting examples of the carbon materials include activated carbon particles, porous carbon particles, carbon fibers, carbon aerogels, porous mesocarbon microbeads, or combinations thereof. In other examples, the electrically conductive materials may include a conductive composite, such as oxides of manganese, or iron, or both, or carbides of titanium, zirconium, vanadium, tungsten, or combinations thereof.

Additionally, the spacer may comprise any ion-permeable, electronically nonconductive material, including membranes and porous and nonporous materials to separate the pair of electrodes. In non-limiting examples, the spacer may have or itself may be space to form flow channels through which a liquid for processing passes between the pair of electrodes.

In certain examples, the electrodes, the current collectors, and/or the bipolar electrodes may be in the form of plates that are disposed parallel to each other to form a stacked structure. In other examples, the electrodes, the current collectors, and/or the bipolar electrodes may have varied shapes, such as a sheet, a block, or a cylinder. Further, the electrodes, the current collectors, and/or the bipolar electrodes may be arranged in varying configurations. For example, the electrodes, the current collectors, and/or the bipolar electrodes may be disposed concentrically with a spiral and continuous space therebetween.

For certain arrangements, the electrical separation unit may be an electrodialysis reversal (EDR) device. The term "EDR" may indicate an electrochemical separation process using ion exchange membranes to remove ions or charged species from water and other fluids. The term "EDR" may indicate an electrochemical separation process using ion exchange membranes to remove ions or charged species from water and other fluids.

As is known, in some non-limiting examples, the EDR device comprises a pair of electrodes configured to act as an anode and a cathode, respectively. A plurality of alternating anion- and cation-permeable membranes are disposed between the anode and the cathode to form a plurality of alternating dilute and concentrate channels therebetween. The anion-permeable membrane(s) are configured to be passable for anions. The cation-permeable membrane(s) are configured to be passable for cations. Additionally, the EDR device may further comprise a plurality of spacers disposed between each pair of the membranes, and between the electrodes and the adjacent membranes.

Accordingly, while an electrical current is applied to the EDR device 12, liquids, such as the streams 13 and 17 (as shown in FIG. 1) pass through the respective alternating dilute and concentrate channels, respectively. In the dilute channels, the stream 13 is ionized. Cations in the stream 13 migrate through the cation-permeable membranes towards the cathode to enter into the adjacent channels. The anions migrate through the anion-permeable membranes towards the anode to enter into other adjacent channels. In the adjacent channels (concentrate channels) located on each side of a dilute channel, the cations may not migrate through the anion-permeable membranes, and the anions may not migrate through the cation permeable membranes, even though the electrical field exerts a force on the ions toward the respective electrode (e.g. anions are pulled toward the anode). Therefore, the anions and cations remain in and are concentrated in the concentrate channels.

As a result, the stream of wash water 17 passes through the concentrate channels to carry the concentrated anions and cations out of the EDR device 12 so that the stream of reject water 19 may be have a higher salinity than the input stream 17. After the circulation of the liquid in the EDR device 12, the precipitation of the salts or other impurities may occur in the precipitation device 14.

In some examples, the polarities of the electrodes of the EDR device 12 may be reversed, for example, every 15-50 minutes so as to reduce the fouling tendency of the anions and cations in the concentrate channels. Thus, in the reversed polarity state, the dilute channels from the normal polarity state may act as the concentrate channels for the second stream 17, and the concentrate channels from the normal polarity state may function as the dilution channels for the input stream 13.

Thus, in a state when the EDR device is at a normal polarity state, stream 13 from a liquid source (not shown) and stream 17 from the precipitation unit 14, respectively, pass through first valves (not shown) along respective first input pipes to enter into the EDR device 12. A dilute stream 15 and an outflow stream 19 pass through second valves (not shown) and enter into respective first output pipes (not shown).

When the EDR device is in a reversed polarity state, the streams 13 and 17 may enter the EDR device 12 along respective second input pipes (not shown). The dilute stream 15 and the outflow stream 19 may flow along respective second output pipes (not shown). Thus, the input streams may be alternately entered into respective pipes to minimize the scaling tendency.

When the precipitation rate plus the discharge rate from the precipitation unit equals the removal rate of the charged species from stream 13, the degree of saturation or supersaturation of the liquid circulating between the EDR device and the precipitation device may stabilize and a dynamic equilibrium may be established.

In some EDR applications, the electrodes may include electrically conductive materials, which may or may not be thermally conductive, and may have particles with small sizes and large surface areas. The spacers may comprise any ion-permeable, electronically nonconductive material, including membranes and porous and nonporous materials. In non-limiting examples, the cation permeable membrane may comprise a quaternary amine group. The anion permeable membrane may comprise a sulfonic acid group or a carboxylic acid group.

In some embodiments, the precipitation of the salts or other impurities may not occur until the degree of saturation or supersaturation thereof is very high. For example, calcium sulfate ($CaSO_4$) often reaches a degree of supersaturation of 500% before precipitation occurs, which may be disadvantageous to the precipitation system. Accordingly, in certain examples, seed particles (not shown) may be added into the precipitation unit 14 to induce precipitation on surfaces thereof at a lower degree of supersaturation of the salts or other ionic impurities. Additionally, the agitation device (not shown) and/or the pump (not shown) may be provided to facilitate suspension of the seed particles in the precipitation unit 14.

In non-limiting examples, the seed particles may have an average diameter range from about 1 to about 500 microns, and may have a concentration range of from about 0.1 weight percent (wt %) to about 30 wt % of the weight of the liquid in the precipitation zone. In some examples, the seed particles may have an average diameter range from about 5 to about 100 microns, and may have a concentration range of from about 1.0 wt % to about 20 wt % of the weight of the liquid in the precipitation zone. In certain applications, the seed particles may comprise solid particles including, but not limited to $CaSO_4$ particles and their hydrates to induce the precipitation. The $CaSO_4$ particles may have an average diameter range from about 10 microns to about 200 microns. In some examples, the $CaSO_4$ seed particle concentration may be in a range of from about 0.1 wt % to about 2.0 wt % of the weight of the liquid in the precipitation zone, so that the concentration of $CaSO_4$ in the solution leaving precipitation unit 14 may be controlled in a range of from about 100% to about 150% of saturation.

In other examples, one or more additives may be added into outflow stream 19 to reduce the degree of saturation or supersaturation of some species. For example, an acidic additive may be added into the EDR or SCD outflow stream 19 to reduce the degree of saturation or supersaturation of calcium carbonate ($CaCO_3$).

It should be noted that seed particles and additives are not limited to any particular seed particles or additives, and may be selected based on specific applications.

The precipitation unit 14 may be any device or vessel made of any materials in any shapes or configurations that precipitation could happen therein. It should be noted that precipitation device 14 is not limited to be used together with any particular supercapacitor desalination (SCD) device or any particular electrodialysis reversal (EDR) device.

In another aspect, a method is provided. The method comprises: treating a stream of feed water 11 in an electrocoagulation (EC) unit 10 to produce a stream of EC treated water 13 less saline than the stream of feed water 11; treating the stream of EC treated water 13 in an electrical separation unit 12 to obtain a stream of product water 15 of lower salinity than the EC treated water 13; providing from a precipitation unit 14 a stream of wash water 17 to wash the electrical separation unit 12 and become a stream of reject water 19, wherein precipitation in the precipitation unit 14 produces the stream of wash water 17 of lower salinity than the stream of reject water 19.

In certain examples, a stream 20 may be discharged to remove a certain amount of the liquid to maintain a constant volume and/or to reduce the degree of saturation or supersaturation of some species in the precipitation unit 14.

After treatment by the EC unit, the hardness (e.g., the concentration of $Ca^{2+}$ and/or $Mg^{2+}$), the alkalinity (e.g., the concentration of $CaCO_3$) and the concentration of silica of the water are decreased/eliminated, so the problems in the electrical separation unit and the precipitation unit caused by the hardness, the alkalinity and silica are limited/eliminated. Besides, a combination of the EC unit, the electrical separation unit and the precipitation unit significantly decreases the salinity of the water and achieves above 95% of overall water recovery.

EXAMPLES

The following examples are included to provide additional guidance to those of ordinary skill in the art in practicing the claimed invention. Accordingly, these examples do not limit the invention as defined in the appended claims.

Compositions of different water were measured using ion concentration characterization in the experiment.

Example 1

Synthetic feed water was prepared to have compositions shown in table 1 below for simulation of the concentrate water from a reverse osmosis membrane desalination device and have NaCl of a concentration to make the conductivity of the synthetic feed water was about 9.8 mS/cm.

TABLE 1

| | composition | | | | | | |
|---|---|---|---|---|---|---|---|
| sample | $Ca^{2+}$ (mg/l) | $Mg^{2+}$ (mg/l) | $Na^+$ (mg/l) | $Cl^-$ (mg/l) | $SO_4^{2-}$ (mg/l) | $SiO_2$ (mg/l) | $Ba^{2+}$ (mg/l) |
| synthetic feed water | 553 | 202 | 923 | 1295 | 2191 | 75 | 0.61 |
| EC treated water | 42 | 0.17 | 836 | 859 | 461 | 0.25 | <0.1 |
| EDR feed water | 42 | 0 | 836 | 859 | 461 | 0 | 0 |
| EDR product water | 6.1 | 0 | 81.2 | 111.5 | 34.9 | 0 | 0 |

The synthetic feed water was fed to an EC device at a flow rate of 2.5 ml/min. The EC device was charged with a constant voltage of 5.1 V and the current was 0.52 A. Both the anode and cathode of the EC device were iron plates. The area of anode was 380 $cm^2$. The composition of EC treated water is listed in table 1 above.

Electrodialysis Reversal (EDR) feed water was prepared to have compositions shown in table 1 above. As can be seen from table 1, the EDR feed water had compositions similar with those of the EC treated water except that the EDR feed water did not comprise $Mg^{2+}$, $SiO_2$ and $Ba^{2+}$ because the concentrations of $Mg^{2+}$, $SiO_2$ and $Ba^{2+}$ in the EC treated water were too low to be simulated.

The EDR feed water was fed into the dilute channel of the EDR unit to produce EDR product water less saline than the EDR feed water. The EDR unit had 4 hydraulic stages and 1 electric stage, and each hydraulic stage had 5 membrane cell pairs, and the area of each membrane was 400 $cm^2$. The EDR unit was run with constant voltage mode, and the voltage was 20 V.

The EDR unit was connected to a precipitation unit which provided a wash stream to wash the concentrate channel of the EDR unit and received the reject stream from the concentrate channel of the EDR. Before the experiment, about 300 g calcium sulfate and EDR feed water were added into the precipitation unit so that an initial concentration of calcium sulfate in the precipitation unit was about 10%.

The polarity of the electricity and the concentrate/dilute channels of the EDR unit were reversed every 1000 seconds, i.e., one cycle took 2000 seconds. The flow rates of the EDR feed stream and the wash stream were both 25 l/h.

During the second cycle, the EDR product water (13.3 l) and waste water (230 ml) discharged from the precipitation unit were collected to calculate the water recovery to be 13.3/(0.23+13.3)×100%=98.3% and for ion concentration analysis. Since the water recovery of EC device was 100%, the water recovery of the combination of the EC unit, the EDR unit and the precipitation unit was 98.3%. If the water recovery of a pretreatment unit was 83% to get the synthetic feed water, the water recovery of a combination of the pretreatment unit, the EC unit, the EDR unit and the precipitation unit would be (83+17×98.3%)/100×100%=99.7%.

The composition of the EDR product water is also shown in table 1 above. It can be seen from table 1 that after treatment by the EC unit, the removal efficiency of $Ca^{2+}$ was (553−42)/553×100%=92.4%, and after further treatment by the EDR unit, the removal efficiency of $Ca^{2+}$ was (553−6.1)/553×100%=98.9%. After treatment by the EC unit, the removal efficiency of $Mg^{2+}$, $Ba^{2+}$ and silica were about 100%. Due to the high removal rate of $Ca^{2+}$ and $Mg^{2+}$, the hardness of the water was significantly decreased.

In the experiment, no chemicals were added for treating the synthetic feed water except that about 300 g of calcium sulfate was used as seeds in the precipitation unit at the beginning, and no chemical was needed for the following process.

Example 2

Synthetic feed water was prepared to have compositions shown in table 2 below to simulate the concentrate water from a cooling tower. The synthetic feed water was fed to an EC device at a flow rate of 5 ml/min or 10 ml/min. The EC device was charged with a constant current of 1 A. Both the anode and cathode of the EC device were iron plates. The area of anode was 380 $cm^2$. The compositions of EC treated waters are listed in table 2 below.

TABLE 2

| sample | composition | | | | | | | | | |
|---|---|---|---|---|---|---|---|---|---|---|
| | $Ca^{2+}$ (mg/l) | $Mg^{2+}$ (mg/l) | $Na^+$ (mg/l) | $Cl^-$ (mg/l) | $SiO_2$ (mg/l) | alkalinity (as $CaCO_3$, ppm) | temp. (° C.) | TDS (mg/l) | pH | cond. (uS/cm) |
| synthetic feed water | 165.85 | 55.35 | 296.10 | 716.35 | 17.05 | 221.00 | 25 | 1305 | 8.01 | 2610.00 |
| EC treated water (10 ml/min) | 11.95 | 10.20 | 303.45 | 523.20 | 0.28 | 54.50 | 25 | 835.25 | 8.16 | 1670.50 |
| EC treated water (5 ml/min) | 5.73 | 4.03 | 299.37 | 472.30 | 0.24 | 50.00 | 25 | 800.5 | 8.50 | 1601.00 |

As can be seen from table 2, after treatment by the EC device, a large portion of the hardness and silica was removed. The alkalinity was decreased from 221 ppm to 54.5 ppm at the flow rate of 10 ml/min and 50 ppm at the flow rate of 5 ml/min.

The Langelier Saturation index (LSI) is an equilibrium model derived from the theoretical concept of saturation and provides an indicator of the degree of saturation of water with respect to calcium carbonate.

This index indicates the driving force for scale formation and growth in terms of pH as a master variable. In order to calculate the LSI, it is necessary to know the alkalinity (mg/L, as $CaCO_3$ or calcite), the calcium hardness (mg/L, $Ca^{2+}$ as $CaCO_3$), the total dissolved solids (mg/L, TDS), the actual pH, and the temperature of the water (° C.): LSI=pH−pHs, pHs=(9.3+A+B)−(C+D), where: A=($Log_{10}$ [TDS]−1)/10; B=−13.12×$Log_{10}$(° C.+273)+34.55; C=$Log_{10}$ [$Ca^{2+}$ as $CaCO_3$]−0.4; and D=$Log_{10}$ [alkalinity as $CaCO_3$].

If LSI is negative: no potential to scale. If LSI is positive: scale can form and $CaCO_3$ precipitation may occur. If LSI is close to zero: borderline scale potential.

The LSI of synthetic feed water was 0.66, likely to scale. After treated with EC at a flow rate of 10 ml/min, the LSI was lowered to −1.01, no risk of scaling. After treated with EC at a flow rate of 5 ml/min, the LSI was lowered to −1.02, no risk of scaling. Hence, with EC's treatment, the hardness, silica and the alkalinity of the water was decreased; the scaling risk in the electrical separation unit was eliminated.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. A water treatment device, comprising:
   an electro-coagulation (EC) unit for treating a stream of feed water to produce a stream of EC treated water of lower salinity than the stream of feed water;
   an electrical separation unit for treating the stream of EC treated water to obtain a stream of product water of lower salinity than the EC treated water, the electrical separation unit comprising at least one of an electrodialysis reversal desalination (EDR) device and a supercapacitor desalination (SCD) device; and
   a precipitation unit for providing a stream of wash water to wash the electrical separation unit and become a stream of reject water flowing back to the precipitation unit, wherein precipitation in the precipitation unit produces the stream of wash water of lower salinity than the stream of reject water,
   wherein the stream of EC treated water flows to the electrical separation unit without flowing through the precipitation unit.

2. The water treatment device according to claim 1, wherein the stream of EC treated water is lower in at least one of hardness, alkalinity, and silica concentration than the stream of feed water.

3. The water treatment device according to claim 1, wherein the stream of product water is lower in at least one of hardness, alkalinity, and silica concentration than the stream of EC treated water.

4. The water treatment device according to claim 1, further comprising a membrane desalination unit before the EC unit.

5. The water treatment device according to claim 4, wherein the membrane desalination unit is a reverse osmosis membrane device.

6. The water treatment device according to claim 1, wherein the electrical separation unit comprises the EDR device and the SCD device.

7. A water treatment method comprising:
   treating a stream of feed water in an electro-coagulation (EC) unit to produce a stream of EC treated water of lower salinity than the stream of feed water;
   treating the stream of EC treated water in an electrical separation unit to obtain a stream of product water of lower salinity than the EC treated water, the electrical separation unit comprising at least one of an electrodialysis reversal desalination (EDR) device and a supercapacitor desalination (SCD) device; and
   providing a stream of wash water from a precipitation unit to wash the electrical separation unit and become a stream of reject water, wherein precipitation in the precipitation unit produces the stream of wash water of lower salinity than the stream of reject water,
   wherein the stream of EC treated water flows to the electrical separation unit without flowing through the precipitation unit.

8. The water treatment method according to claim 7, wherein the stream of feed water is from a membrane desalination unit.

9. The water treatment method according to claim 8, wherein the membrane desalination unit is a reverse osmosis membrane device.

10. The water treatment device according to claim 7, wherein the electrical separation unit comprises the EDR device and the SCD device.

11. The water treatment method according to claim 7, wherein the stream of EC treated water is lower in at least one of hardness, alkalinity, and silica concentration than the stream of feed water.

12. The water treatment method according to claim 7, wherein the stream of product water is lower in at least one of hardness, alkalinity, and silica concentration than the stream of EC treated water.

* * * * *